(12) United States Patent
Young et al.

(10) Patent No.: US 9,910,683 B2
(45) Date of Patent: Mar. 6, 2018

(54) DYNAMIC APPLICATION OPTIMIZATION

(71) Applicant: LENOVO (Singapore) PTE, LTD., New Tech Park (SG)

(72) Inventors: Bryan L. Young, Apex, NC (US); Marc Richard Pamley, Durham, NC (US); Alan Ladd Painter, Cary, NC (US); Albert Vincent Makley, Morrisville, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 372 days.

(21) Appl. No.: 14/229,413

(22) Filed: Mar. 28, 2014

(65) Prior Publication Data
US 2015/0277971 A1    Oct. 1, 2015

(51) Int. Cl.
G06F 9/00       (2006.01)
G06F 9/445    (2018.01)
G06F 9/50       (2006.01)
G06F 9/44       (2018.01)

(52) U.S. Cl.
CPC ........ *G06F 9/44521* (2013.01); *G06F 9/4411* (2013.01); *G06F 9/44505* (2013.01); *G06F 9/5005* (2013.01); *G06F 9/441* (2013.01); *G06F 2209/5022* (2013.01)

(58) Field of Classification Search
CPC ............... G06F 9/44521; G06F 9/4411; G06F 9/44505; G06F 9/5005; G06F 9/441
See application file for complete search history.

(56) References Cited

U.S. PATENT DOCUMENTS

| | | | | |
|---|---|---|---|---|
| 7,093,147 B2* | 8/2006 | Farkas | .................. | G06F 1/3203 713/320 |
| 7,636,863 B2* | 12/2009 | Oh | ........................ | G06F 1/3203 713/300 |
| 7,657,613 B1* | 2/2010 | Hanson | ................. | G06F 3/0605 707/812 |
| 8,296,490 B2* | 10/2012 | Li | ........................... | G06F 13/24 709/250 |
| 8,683,243 B2* | 3/2014 | Wu | ....................... | G06F 1/3287 713/320 |
| 2011/0066828 A1* | 3/2011 | Wolfe | ................... | G06F 9/5044 712/220 |
| 2011/0258413 A1* | 10/2011 | Cho | ....................... | G06F 9/5044 712/16 |

* cited by examiner

*Primary Examiner* — Mark Connolly
(74) *Attorney, Agent, or Firm* — Kunzler, PC

(57) ABSTRACT

For dynamic application optimization, a method is disclosed that includes detecting, by use of a processor, an altered need for a resource in an executing application, identifying one or more configuration parameters for configuring an operating environment for the application, and applying the one or more configuration parameters in response to detecting the altered need.

20 Claims, 13 Drawing Sheets

DYNAMIC APPLICATION OPTIMIZATION

BACKGROUND

Field

The subject matter disclosed herein relates to executing applications and more particularly relates to dynamic application optimization.

Description of the Related Art

Computing devices in various forms typically execute a wide variety of different software applications. Depending on the capabilities and features of the software applications, different settings of the computing device, or components of the computing device may affect how the application operates. Some settings may increase performance of one application, but may reduce performance of another application. Other settings may enhance stability of the computing device, but may reduce performance.

In other scenarios, certain settings may increase performance of one application, but may cause another application to operate poorly or even crash. Therefore, optimizing a computing device that may execute a wide variety of different software applications may be difficult.

In one solution, a computing device may alter settings when an application is instantiated. Although this may optimize one application when it is started, if another application is instantiated before the first application has completed, the optimization settings for the second application may interfere with first application.

BRIEF SUMMARY

An apparatus for dynamic application optimization is disclosed. In one embodiment, the apparatus includes a processor and a memory that stores executable code. In another embodiment, the executable code includes code that detects an altered need for a resource associated with an executing application. In another embodiment, the executable code includes code that identifies one or more configuration parameters for configuring an operating environment for the application, and code that applies the one or more configuration parameters in response to detecting the altered need. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
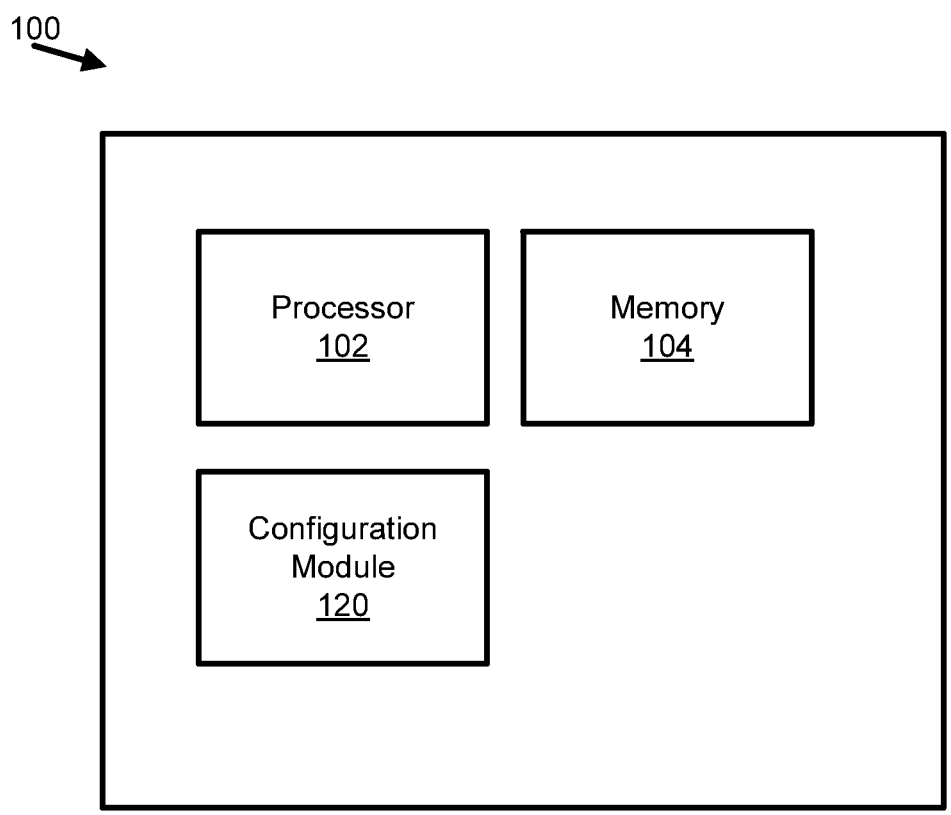
FIG. 1 is a schematic block diagram illustrating one embodiment of an apparatus for dynamic application optimization in accordance with the present disclosure.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code. The description of elements in each figure may refer to elements of proceeding figures. Like numbers refer to like elements in all figures, including alternate embodiments of like elements.

FIG. 1 is a schematic block diagram illustrating one embodiment of an apparatus for dynamic application optimization in accordance with the present disclosure. In one embodiment, the apparatus 100 includes a processor 102, a memory 104, and a configuration module 120.

In one embodiment, the apparatus 100 includes a processor 102 that executes executable code. The processor may be any of a wide variety of processors 102. The processor 102 may include a reduced instruction set or a complex instruction set, or other, or the like. The processor 102 may include one processing core, or many processing cores. The processor may include multiple chips, dies, die planes, or the like. The processor may include cache in different forms as one skilled in the art may appreciate. Therefore, in different embodiments, the processor may be any kind of processor capable of executing executable code as one skilled in the art may appreciate.

In one embodiment, the apparatus 100 may include a memory 104. The memory 104 may include any available, or to be developed memory technology. The memory 104 may include volatile memory and/or non-volatile memory. The memory 104 may include memory that stores executable code that may be loaded by a processor for execution. In another embodiment, the memory 104 may include volatile memory storing code being executed by the processor 102.

In one embodiment, an application may be executed by the processor. An application may include executable code that the operating system may instantiate in response to a request by a user. An application, in certain embodiments may include code executed in response to a request form a user. An application may or may not be distributed with an operating system for a computing device as one skilled in the art may appreciate.

In another embodiment, an application may operate as part of an operating system. For example, the executable code may include Windows™, Linux and/or Linux variants, UNIX and/or UNIX variants, IOS™, or other operating systems, or the like. In one example, the application may include a portion of an operating system. In another embodiment, the application may include other executable code. The executable code may include a driver. A driver may include executable code that communicates or operates a physical or virtual component of a computing device. A driver may affect different components, may be different versions. Therefore, the executable code, in certain embodiments, may include any type of driver code as one skilled in the art may appreciate.

In another embodiment, the driver may include a wide variety of different settings. Driver settings may include resources to use, components to control, may enable or disable portions of a component, may alter behavior of the component. Of course, one skilled in the art may appreciate a wide variety of different settings that may affect a driver and this disclosure is meant to include all such settings.

In one embodiment, the apparatus 100 may include a configuration module 120. The configuration module 120 may include code that detects an altered need for resources in an executing application. As described herein, an executing application may include a portion of executable code that has been loaded into a memory for execution by the processor 102. An executing application may include executable code that has been loaded into memory of the processor 102 for execution. An executing application may include an application that has been started, instantiated, initialized, or the like. An executing application may include a driver that has been installed and is currently affecting a component of the apparatus 100. The component may include a physical component or a virtual component.

In certain embodiments, the executing application may not display concurrent with operation. In one example, a driver may be executing, but may not display at a display of the apparatus 100.

In one embodiment, an altered need for an executing application may include the executing application switching into focus. In one example, switching into focus may include the application becoming a foreground application. In one example, the apparatus 100 may be executing more than one application. One application may be executing in a background and another executing application may be executing in a foreground. Executing in the background may include an executing application that has been minimized, is being displayed behind another application or window, or is otherwise not currently viewable by a user of the apparatus 100. An application executing in the background may not receive input from a user because input from a user may be directed to an application that is in the foreground. An application executing in the foreground may include an application that is currently configured to receive input from the user. An operating system for the apparatus 100 may receive user input and may direct the input to the executing application in the foreground.

In one embodiment, the configuration module 120 may switch to an application executing in the background in response to a selection by a user. In one example, the user may select the application that is executing, but is not currently viewable. In another example, the user may switch to the application that is in the background. Therefore, in certain embodiments, the altered need may include an operating system switching from one executing application to another executing application. In this embodiment, the altered need may include the application switched to having an increased need to use a display for the apparatus.

In another embodiment, the altered need may include an executing application having an increased need for the processor 102. For example, in response to a user, the executing application may begin consuming more processor 102 cycles than before. The configuration module 120 may detect the increased processor cycles used by the application and may determine that the application has an increased need to use the processor 102.

In another embodiment, the altered need may include an executing application having an increased need for an input/output device. An input/output device may include any physical or virtual device capable of receiving or transmitting electronic signals. For example, in response to a user, an executing application may begin transmitting more data than previously. The configuration module 120 may detect the increased input or output and may determine that the application has an increased need to use an input/output device.

In another embodiment, the altered need may include an executing application having an increased need for memory or other storage. For example, in response to a user, an executing application may request more memory than previously used. The configuration module 120 may detect the increased memory usage by the executing application and may determine that the application has an increased need for the memory.

In other embodiment, the configuration module 120 may detect that the application may have an increased or decreased need to use any other resource available to the apparatus, such as, but not limited to, processors, memory, displays, storage, other devices, or the like, and this disclosure is intended to include all such resources usable by an executing application.

In another embodiment, the altered need may be based on a current need exceeding a threshold value. For example, a threshold value for processor use may be 90%. The configuration module 120 may detect an altered need based on an application using 90% or more of the processor cycles. Of course, other threshold values may be used as one skilled in the art may appreciate.

In another embodiment, the configuration module 120 may include code that identifies one or more configuration parameters for configuring the operating environment for the application. An operating environment for the application may include, hardware settings, BIOS settings, driver settings, operating system settings, application settings, or other settings or configuration parameters that may affect how the application operates. Settings or configuration parameters, as described herein, may include any and all application settings, operating system settings, driver settings, module settings, hardware settings, virtual settings, or other, or the like. Therefore, in certain embodiments, configuration parameters may include settings and/or any other values or states that may alter or affect execution of the application.

In one embodiment, configuration parameters may be stored locally. For example, configuration parameters may be stored on a hard drive or other non-volatile storage device. In another example, configuration parameters may be stored in a volatile memory device.

In another embodiment, configuration parameters may be received from a remote source. For example, configuration parameters for configuring an operating environment for an application may be downloaded from a remote server. In one example, a manufacturer of a computing device may specify configuration settings for specific application that may be executed at the computing device. Therefore, in one embodiment, the configuration module 120 may, in response to the application switching into the foreground, may download configuration parameters from the manufacturer's servers.

In one embodiment, the configuration module 120 may load configuration parameters from a profile of configuration parameters. In one embodiment, the user may indicate one or more configuration parameters to be associated with an application. The configuration module 120 may store the indicated configuration parameters in a profile associated with the application. In response to the configuration module 120 detecting an altered need for a resource, the configuration module 120 may load one or more configuration parameters from the profile.

In another embodiment, the configuration module 120 may combine configuration parameters from multiple sources. In one example, the configuration module 120 may identify a configuration parameters from a manufacturer's list of configuration parameters and also identify a configuration parameter from a profile associated with the application. Therefore, in certain embodiments, the one or more configuration parameters may identify configuration parameters from more than one source of configuration parameters.

In one embodiment, the configuration parameters may modify usage of one or more compute resources for the apparatus 100. In one example, the configuration parameters may enable or disable a hardware component of the apparatus 100. In another example, the configuration parameters may cause a component to perform faster or slower. In another example, the configuration parameters may alter a priority for one or more components of the apparatus 100.

In another embodiment, the configuration parameters may configured processor affinity for the application. For example, a configuration parameters may instruct an operating system to execute the application on a first of four processors. In another embodiment, the configuration may alter a core configuration for a processor. For example, the processor 102 may include four cores. In response to the application using one process, the configuration parameters may instruct the processor 102 to combine more than one core to increase the performance of the resulting core, and the application.

In another embodiment, the configuration module 120 may identify configuration parameters based on parameters for related software components. For example, where one or more software components were installed with the application, the configuration module 120 may identify configuration parameters for the software components as associated with the application.

In another embodiment, the configuration parameters may alter access to memory. In one example, the memory may include a page file for an operating system operating the application. The configuration parameters may deny access to the page file for the application.

In another embodiment, the configuration module 120 may include code that applies the one or more of the configuration parameters in response to detecting the altered need. In one embodiment, the configuration module 120 may detect the altered need, and may apply one or more configuration parameters after identifying the one or more configuration parameters.

In one embodiment, the configuration module 120 may reallocate memory for the application. Relocating memory for the application may include copying memory from one location in memory to another location in memory.

In another embodiment, the configuration module 120 may move execution of the application from one processor to another processor. In one example, the application may be executing on a first processor. In response to detecting an altered need by the application, the configuration module 120 may move execution of the application from the first processor to another processor.

In another embodiment, in response to detecting an altered need of an application, the configuration module may apply one or more configuration parameters to change an interface for the application. In one example, the application may use a 100 Mbit Ethernet. In response to the application using 100% of the capability of the 100 Mbit Ethernet, the configuration module 120 may move the network communications from the 100 Mbit Ethernet hardware to a 1000 Mbit hardware. Therefore, in certain embodiments, the configuration module 120 may move an interface from one component to another component. In another embodiment, the configuration module 120 may change a communication protocol version for the network interface.

In another embodiment, in response to detecting an altered need of an application, the configuration module 120 may apply one or more configuration parameters to change a storage device for the application. For example, the application may store information on a first hard drive. In one embodiment, the configuration module 120, in response to a detected altered need, may move storage from the first hard drive to another hard drive. The configuration module 120 may move the storage by remapping storage designations, copying storage from one location to another location, or other, or the like. In one example, the configuration parameters may indicate a faster storage location. In another example, the configuration parameters may indicate a storage location with more capacity.

In another example, the application may communicate with a compute card that includes many additional processors. The configuration module 120 may move the processing associated with an application from the one compute card to another compute card in response to an altered need by the application. In certain embodiments, the application may be optimized for a certain compute card and the configuration module 120 may ensure that the correct compute card may be enabled in response to the application having an altered need as described herein.

In one embodiment, a first application may be compiled and optimized for a first compute card, and a second application may be compiled and optimized for a second compute card. Therefore, in one embodiment, the configuration module 120 may disable a first compute card, or other, or the like. In another embodiment, the configuration parameters may alter priorities for components, power issues for components, or other features of components to enhance the operating environment for an application having an altered need.

In one embodiment, the configuration parameters may increase performance for the application, but may decrease reliability for the application. For example, disabling a swap file (or page file) for the apparatus 100 may increase performance of the application, however, this may also result in the application crashing.

In one embodiment, the configuration module 120 may store configuration parameters with successful indicators. In response to an application crashing, the configuration module 120 may remember the set of applied configuration parameters that were in effect when the application failed. In one example, the configuration module 120 may store the configuration parameters in response to the application crashing or otherwise failing. In response to the configuration module 120 detecting an altered need for the application, the configuration module 120 may identify one or more configuration parameters that are different from the set of configuration parameters that may have caused the application to crash. The configuration module 120 may then recommend alternative configuration parameters to the user to limit crashing of the application in similar scenarios.

In another embodiment, the configuration module 120 may receive an indication from the user that indicates user preferences. In one embodiment, the configuration module 120 may identify configuration parameters that meet indications by the user. For example, the user may indicate that performance has a higher priority than reliability. In certain embodiments, the configuration module 120 may apply configuration parameters to configure an operating environment for the application focused on performance.

Figure 2:
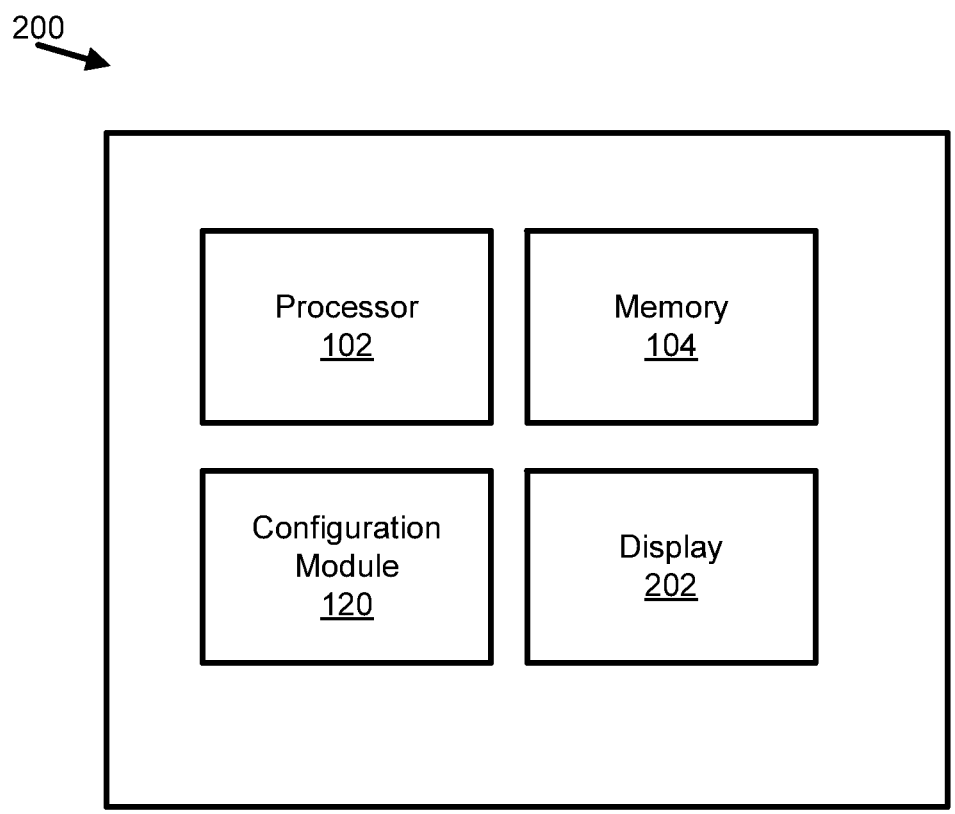
FIG. 2 is a schematic block diagram illustrating one embodiment of an apparatus for dynamic application optimization in accordance with the present disclosure.

FIG. 2 is a schematic block diagram illustrating one embodiment of an apparatus 200 or dynamic application optimization in accordance with the present disclosure. In one embodiment, the apparatus 200 may include the processor 102, the memory 104, and the configuration module 120. The processor 102, the memory 104, and the configuration module 120 may or may not be substantially similar to those depicted in FIG. 1.

In one example, the configuration parameters may alter graphical display of objects. For example, the configuration module may alter graphical components, such as, but not limited to, pointer size, pointer shape, pointer trail, color palettes, display resolution, or other, or the like. Therefore, in certain embodiments, the configuration module 120 may modify properties of a graphical display in response to detecting an altered need as described herein.

Figure 3:
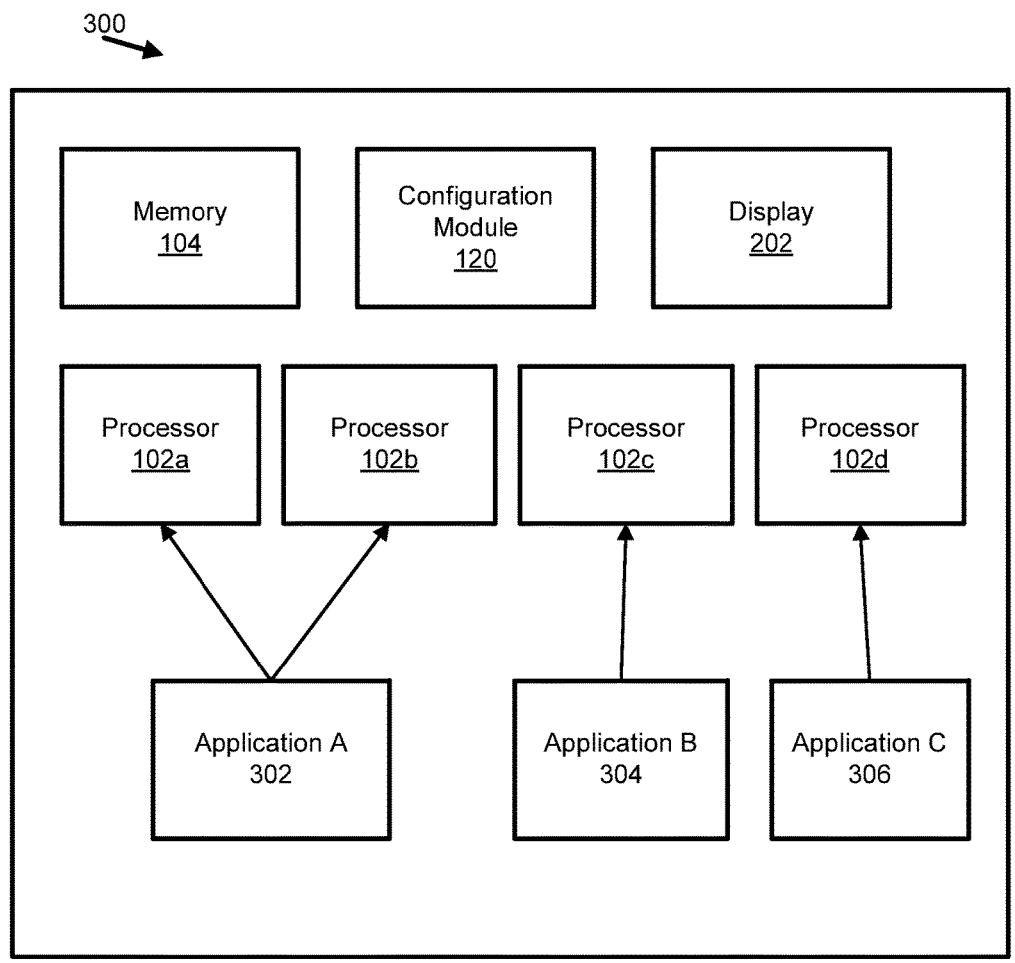
FIG. 3 is a schematic block diagram illustrating one embodiment of an apparatus for dynamic application optimization in accordance with the present disclosure.

FIG. 3 is a schematic block diagram illustrating one embodiment 300 of an apparatus for dynamic application optimization in accordance with the present disclosure. In one embodiment 300, the apparatus may include the memory 104, the display 202, the configuration module 120, and four processors 102a, 102b, 102b, 102d. The memory 104, the configuration module 120, the display 202 and the processors may or may not be substantially similar to those depicted in FIGS. 1-2.

In one embodiment, the apparatus 300 may execute a first application A 302 on processors 102a and 102b. The apparatus 300 may execute a second application B on processor 102c, and a third application C on processor 102d. In response to the user switching the focus from application A 302 to application B 304 the configuration module 120 may restrict application A to processor 102a, and may allow application B to process using both processors 102b and 102c. Therefore, in certain embodiments, the configuration module 120 may move different application to different processors as the user switches from one application to another. This may allow increased computing power to an application executing in a foreground of the apparatus 300.

In another example, in response to application B 304 request additional compute power, and application B including a single thread, the configuration module 120 may adjust a core configuration of processors 102b and 102c to a single core and increase the computing capability of the resulting processor. This may allow for increased performance of single threaded applications.

Figure 4:
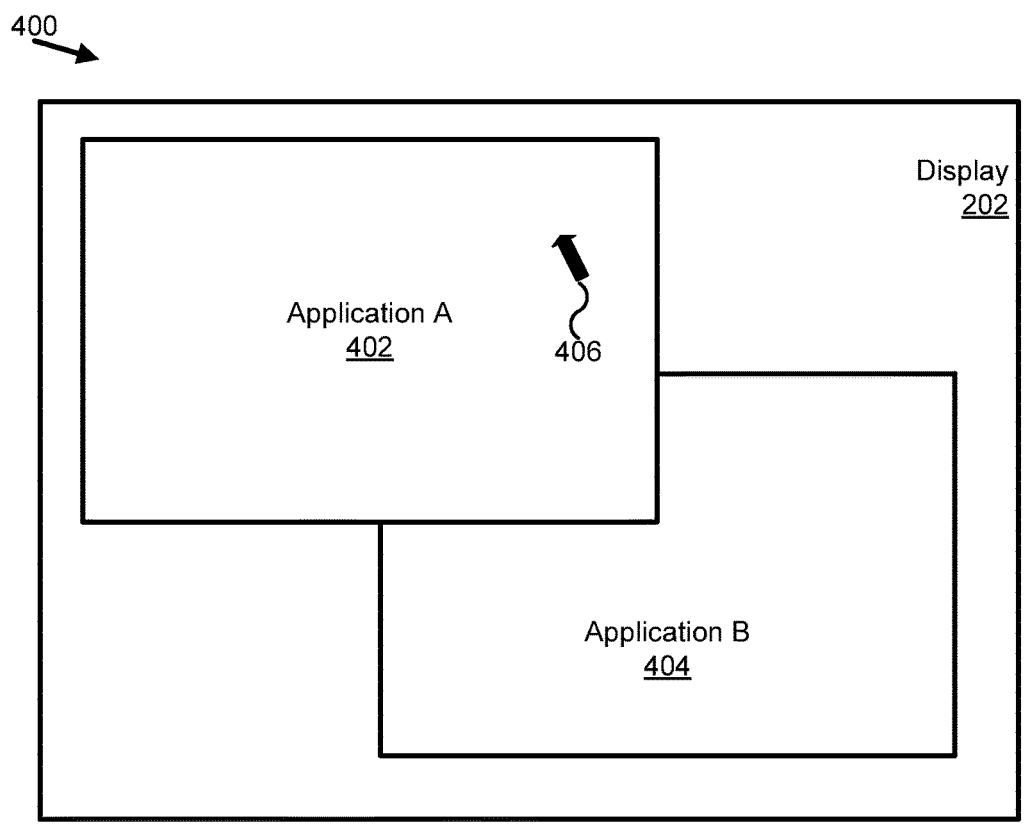
FIG. 4 is a schematic block diagram illustrating one scenario in accordance with one embodiment of the present disclosure.

FIG. 4 is a schematic block diagram illustrating one scenario in accordance with one embodiment 400 of the present disclosure. In one embodiment 400 of a display 202, the display may depict a first application A 402 and a second application B 404. Before a selection by a user, application B may be executing in a foreground of the display 202 and application A may be executing in a background of the display 202.

In one embodiment, the user may use a pointer 406 to select application A 402. Selecting application A 402 may cause the configuration module 120 may move application A to a foreground of the display 202 and may move application B to a background for the display. The configuration module 120 may detect that application A has an altered need for the display based on the user selection.

Figure 5:
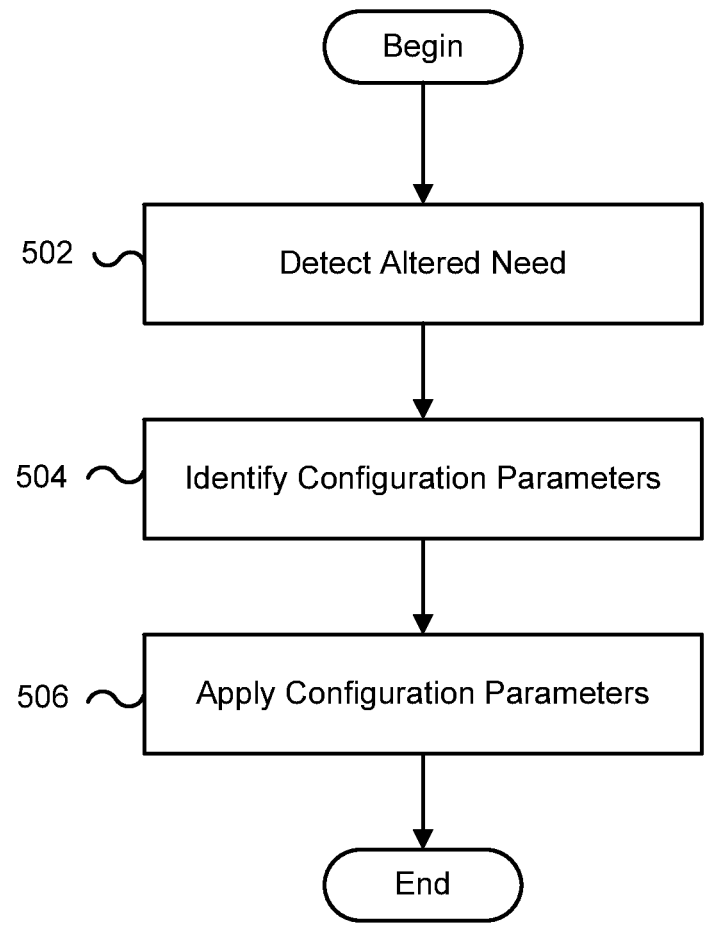
FIG. 5 is a schematic flow chart diagram illustrating one embodiment of a method in accordance with the present disclosure.

FIG. 5 is a schematic flow chart diagram illustrating one embodiment of a method 500 in accordance with the present disclosure. In one embodiment, the method may begin and the configuration module 120 may detect 502 an altered need for a resource in an executing application. The configuration module 120 may identify 504 one or more configuration parameters for configuring an operating environment for the application. The configuration module 120 may apply the one or more configuration parameters in response to detecting the altered need and the method may end.

Figure 6:
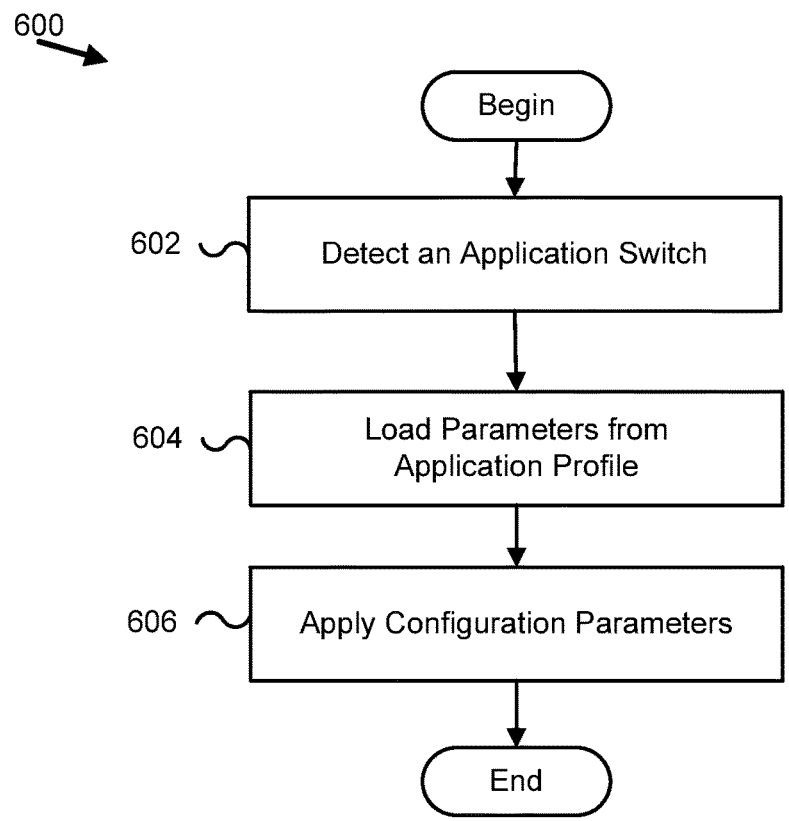
FIG. 6 is a schematic flow chart diagram illustrating one embodiment of a method in accordance with the present disclosure.

FIG. 6 is a schematic flow chart diagram illustrating one embodiment of a method 600 in accordance with the present disclosure. In one embodiment, the method 600 may begin and the configuration module 120 may detect 602 an application switching into focus. The configuration module 120 may load 604 one or more configuration parameters from a profile associated with the application. The configuration module 120 may apply the one or more configuration parameters in response to detecting the switch of the application and the method may end.

Figure 7:
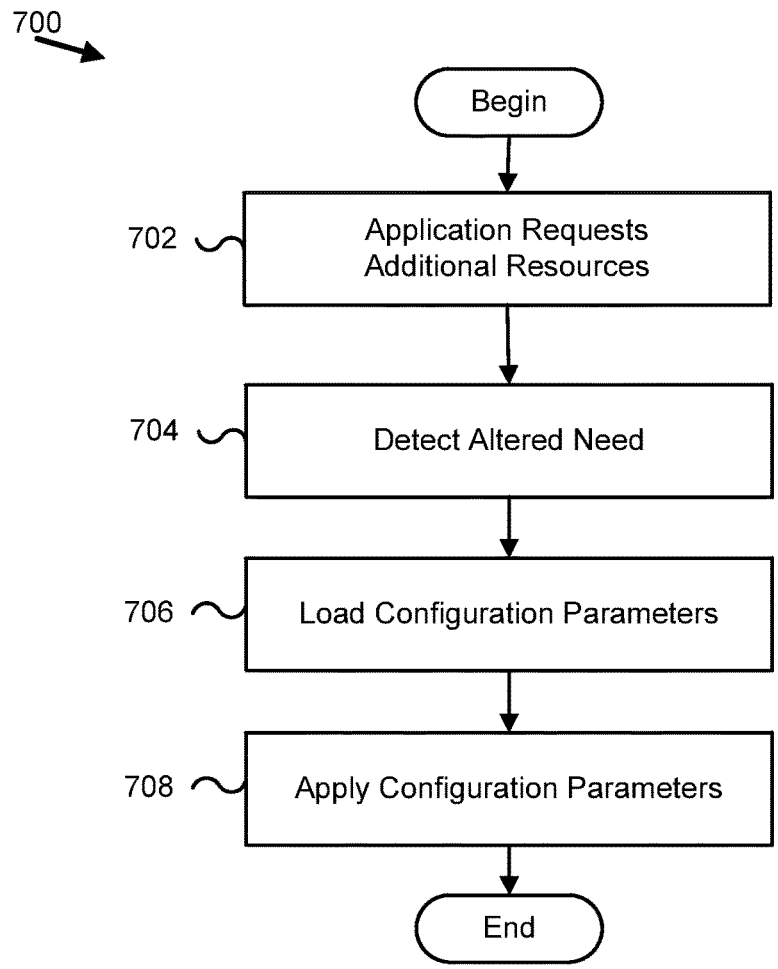
FIG. 7 is a schematic flow chart diagram illustrating one embodiment of a method in accordance with the present disclosure.

FIG. 7 is a schematic flow chart diagram illustrating one embodiment of a method 700 in accordance with the present disclosure. In one embodiment, the method 700 may begin and an application may request 702 additional compute resources. The configuration module 120 may detect 704 an altered need for the compute resources based on the request. The configuration module 120 may load 706 one or more configuration parameters from a local storage of configuration parameters associated with the application. The configuration module 120 may apply 708 the one or more configuration parameters in response to detecting the altered need and the method may end.

Figure 8:
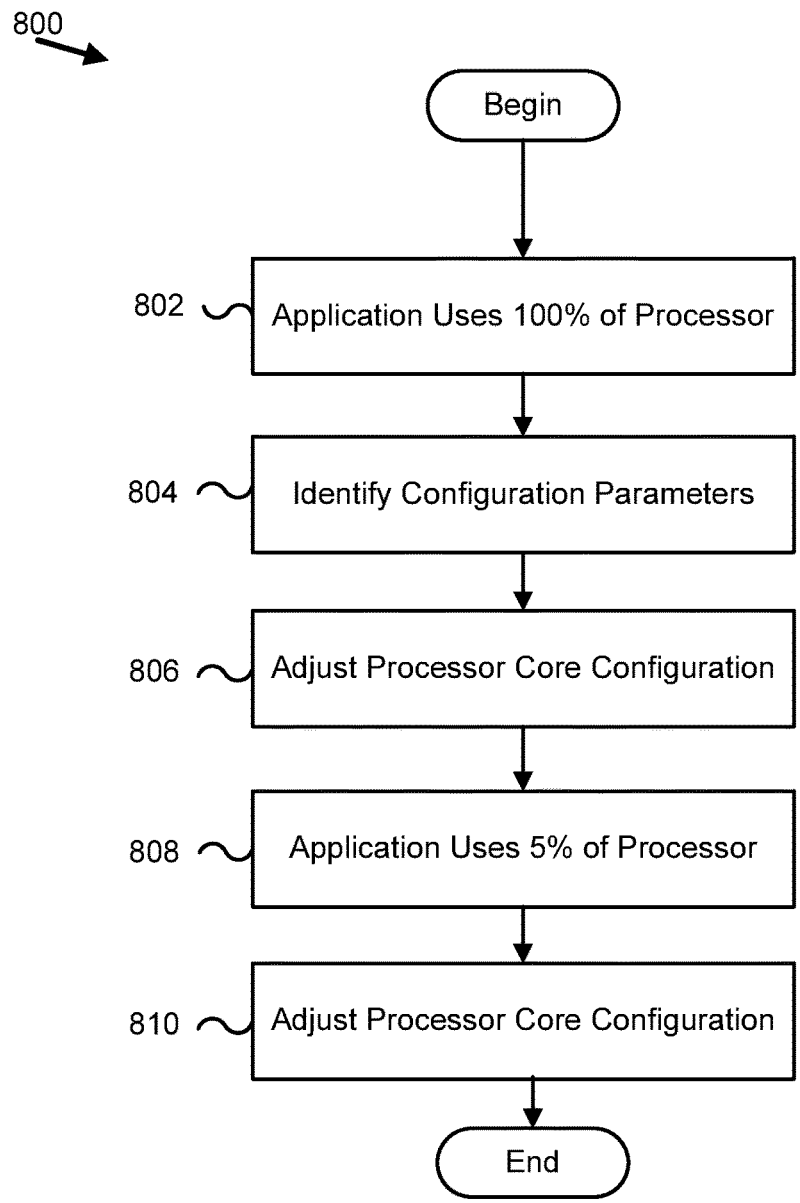
FIG. 8 is a schematic flow chart diagram illustrating one embodiment of a method in accordance with the present disclosure.

FIG. 8 is a schematic flow chart diagram illustrating one embodiment of a method 800 in accordance with the present disclosure. In one embodiment, the configuration module 120 may detect an altered need based on an application using more than 90% of compute resources available. The method 800 may begin and an application may use 100% of a processor. The configuration module 120 may identify 804 one or more configuration parameters associated with the application exceeding the 90% threshold value of compute resources. The configuration module 120 may adjust 806 a processor core configuration based on the one or more configuration parameters. The application may then use 808 5% of the available compute resources. Because the application may now use less than the threshold value of compute resources, the configuration module 120 may adjust 806 the processor core configuration to allow more compute resources to other applications and the method 800 may end.

Figure 9:
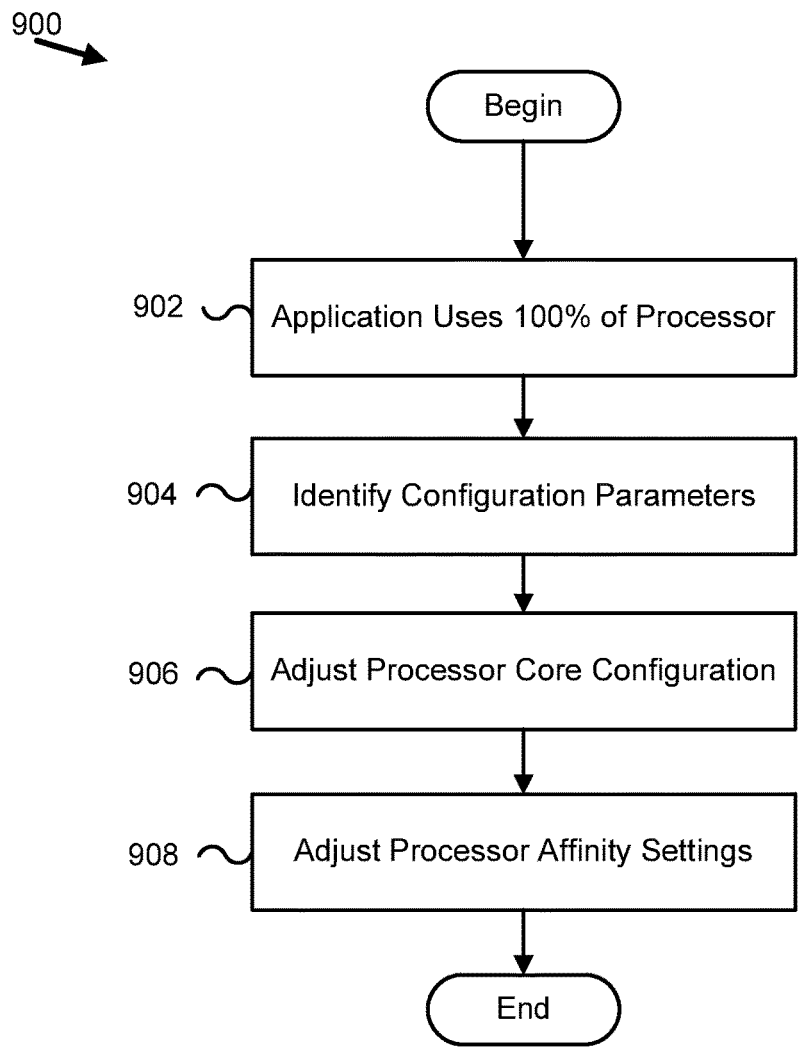
FIG. 9 is a schematic flow chart diagram illustrating one embodiment of a method in accordance with the present disclosure.

FIG. 9 is a schematic flow chart diagram illustrating one embodiment of a method 900 in accordance with the present disclosure. In one embodiment, the method may begin and an application may use 902 100% of available compute power. The configuration module 120 may determine the altered need of the compute power and may identify 904 one or more configuration parameters associated with the application. The configuration module 120 may adjust 906 a core configuration for the processor. Furthermore, the configuration module 120 may adjust 908 processor affinity settings based on the detected altered need (the 100% processor usage) and the method 900 may end. Therefore, in certain embodiments, the configuration module 120 may move applications to other processors and/or reconfigure processors based on computing need of the applications.

In another example of the method, the configuration module 120 may move an application that is using 100% of a processor to an isolated processor and may move other executing applications to other processors. This may provide increased processing resources available to applications that use more compute power, and may further allow other executing application processing power by moving them to less busy processors.

Figure 10:
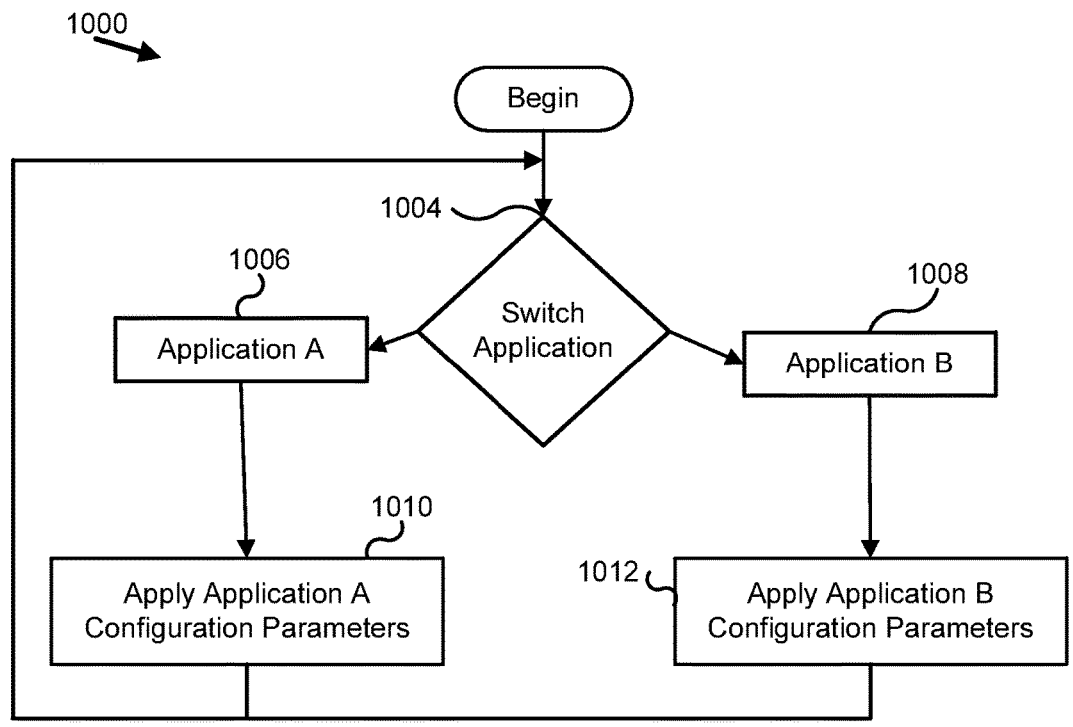
FIG. 10 is a schematic flow chart diagram illustrating one embodiment of a method in accordance with the present disclosure.

FIG. 10 is a schematic flow chart diagram illustrating one embodiment of a method 1000 in accordance with the present disclosure. In one embodiment, the method 1000 may begin and the configuration module 120 may switch 1004 to application A 1006. The configuration module 120 may identify one or more configuration parameters and apply 1010 the one or more configuration parameters. The method may continue at block 1004 where the configuration module 120 may switch 1004 to application B 1008. The configuration module 120 may identify one or more configuration parameters and apply 1012 the one or more configuration parameters. The method may continue at block 1004 where the configuration module 120 may switch to one of application A or application B. Therefore, in certain embodiments, the configuration module 120 may continuously apply configuration parameters associated with application switched to.

Figure 11:
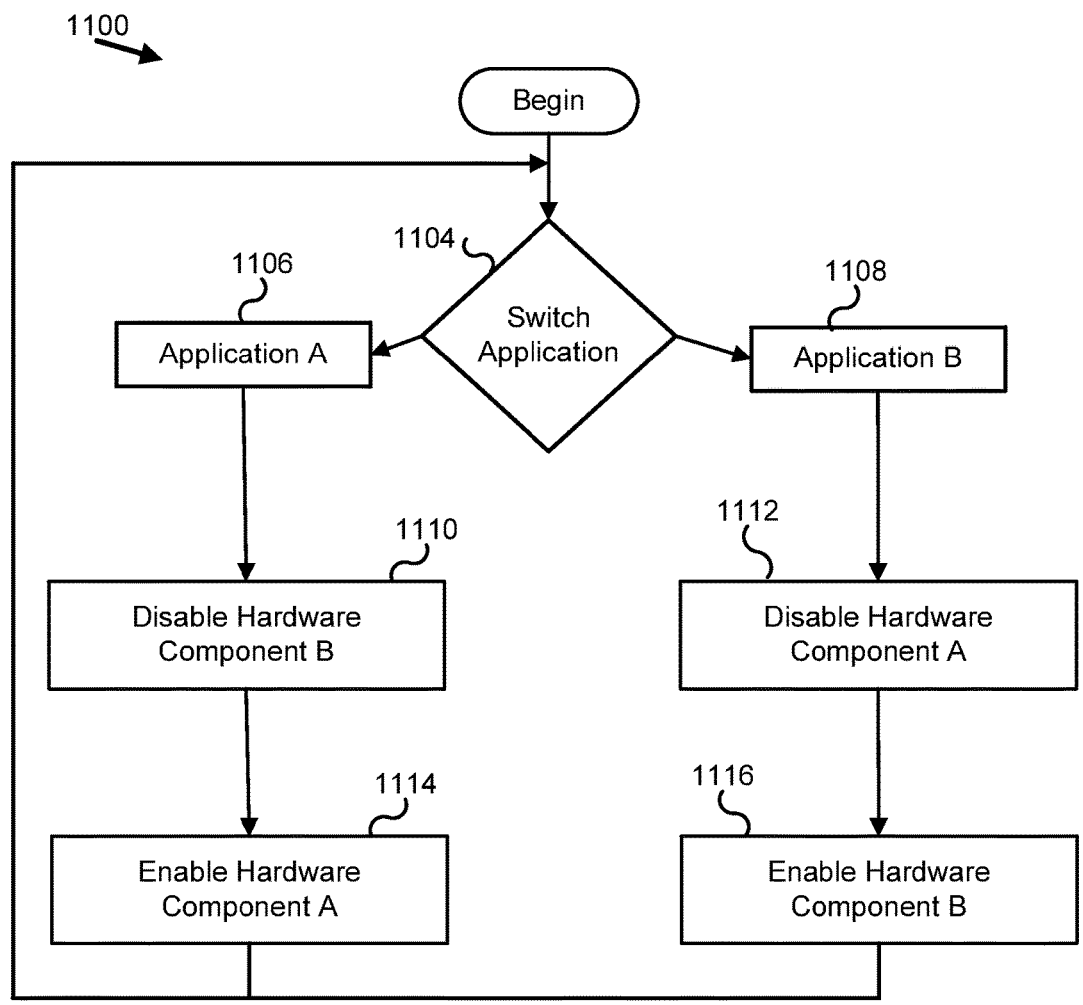
FIG. 11 is a schematic flow chart diagram illustrating one embodiment of a method in accordance with the present disclosure.

FIG. 11 is a schematic flow chart diagram illustrating one embodiment 1100 of a method in accordance with the present disclosure. In one embodiment, the method 1100 may begin and the configuration module 120 may switch 1104 to one of application A or application B. In one embodiment, the configuration module may switch 1104 to application A. The configuration module 120 may disable 1110 hardware component B. The configuration module 120 may enable 1114 hardware component A and the method 1100 may continue at block 1104 where the configuration module 120 may switch 1104 to application B 1108. The configuration module 120 may disable 1112 hardware component A and may enable 1116 hardware component B. The method may continue at block 1104 where the configuration module 120 may switch to one of application A 1106 or application B 1108.

In one example of the method 1100, an application A may have been optimized to perform efficiently using hardware component A and an application B may have been optimized to perform efficiently using hardware component B. In response to the user switching from one application or the other, the configuration module may enable hardware components the application is optimized to perform. This may ensure that an application that has the focus of the user may perform more efficiently. Furthermore, the configuration module may configure the application that has focus of the operating system.

Figure 12:
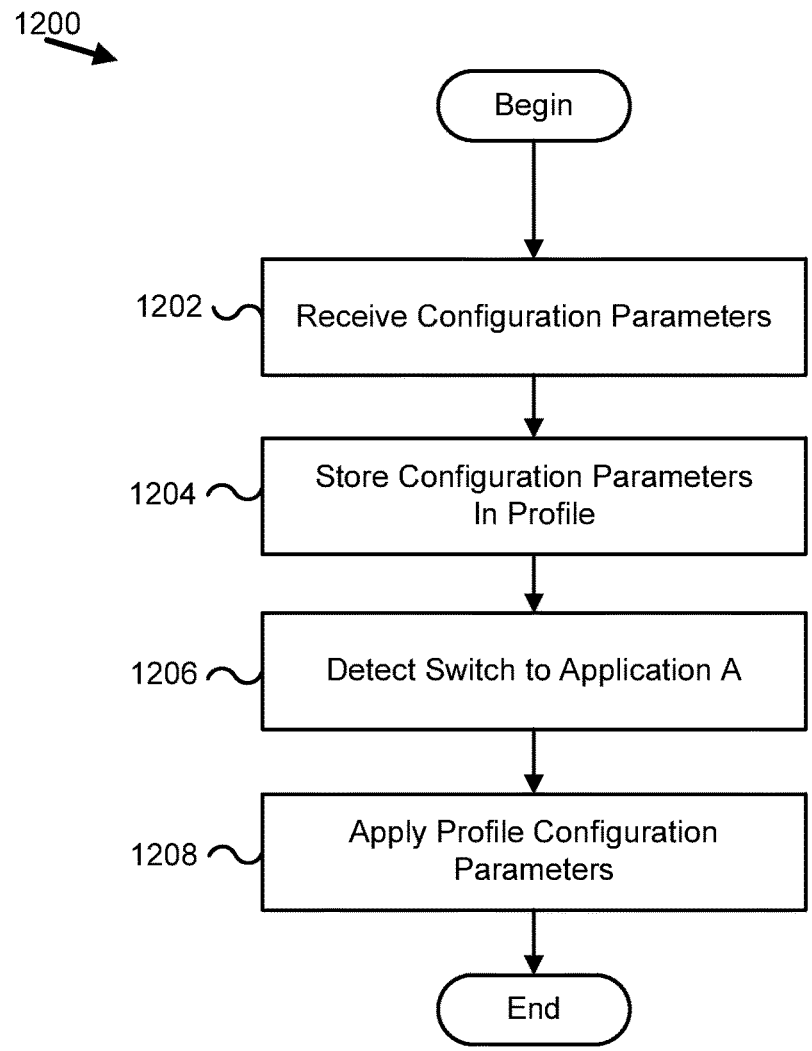
FIG. 12 is a schematic flow chart diagram illustrating one embodiment of a method in accordance with the present disclosure.

FIG. 12 is a schematic flow chart diagram illustrating one embodiment 1200 of a method in accordance with the present disclosure. In one embodiment, the configuration module 120 may receive 1202 configuration parameters from a user. In another embodiment, the configuration module 120 may receive 1202 configuration parameters from a remote server.

The configuration module 120 may store 1204 received configuration parameters on a storage device. The configuration module may detect 1206 an altered need for an application by detecting a switch of the application into focus or into a foreground for a display. The configuration module may apply 1208 configuration parameters for the application with the altered need and the method 1200 may end.

Figure 13:
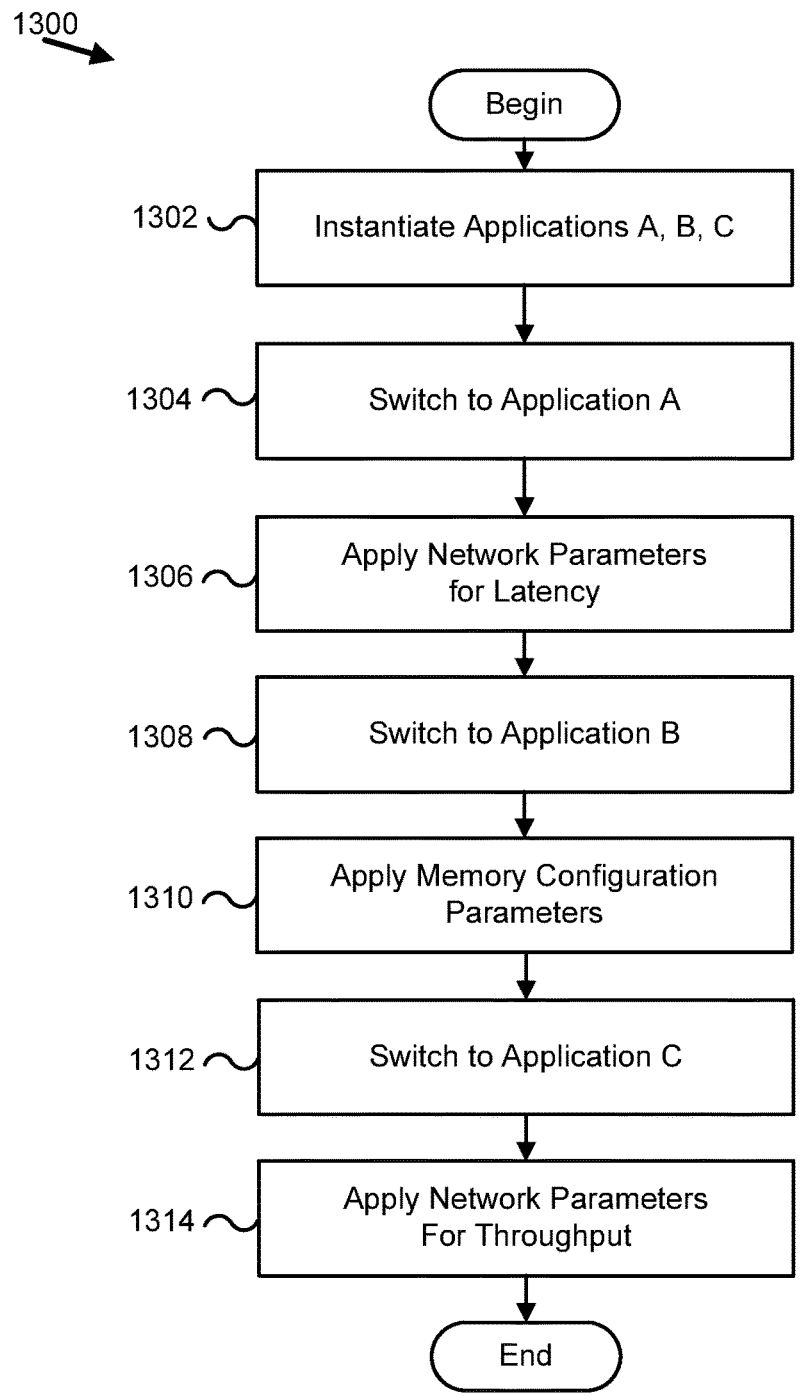
FIG. 13 is a schematic flow chart diagram illustrating one embodiment of a method in accordance with the present disclosure.

FIG. 13 is a schematic flow chart diagram illustrating one embodiment of a method 1300 in accordance with the present disclosure. In one embodiment, the method may begin and the configuration module 120 may instantiate 1302 applications A, B, and C. In response to a request from a user, the configuration module 120 may switch 1304 to application A. The configuration module 120 may identify configuration parameters that configure an operating environment for the application by applying 1306 network communication settings to minimize latency. Thereafter, the configuration module 120 may switch 1308 to application B. The configuration module 120 may apply 1310 configuration parameters that modify memory settings. The configuration module 120 may switch 1312 to application C. The configuration module 120 may apply 1314 network configuration parameters to optimize throughput and the method may end.

In this example, the network settings for application A optimize latency and reduce throughput. For example, the network settings may reduce a packet size for network packets. Furthermore, the network settings for application C optimize throughput and reduce latency. For example, the network settings for application C may increase a packet size for network packets. Therefore, based on an application that has focus or is in the foreground of a display, the configuration module 120 may apply settings to optimize the application in the foreground. In some examples, the applied settings may reduce efficiency for application that operate in a background or that do not have focus of the user interface.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a display operatively coupled to the processor;
   a memory that stores code executable by the processor, the code comprising:
   code that detects a use of a plurality of types of resources associated with an executing application;
   code that detects an altered need for a resource of the plurality of types of resources associated with the executing application;
   code that identifies one or more configuration parameters for configuring an operating environment for the application, wherein at least one configuration parameter comprises a configuration parameter combined from a plurality of sources; and
   code that applies the one or more configuration parameters in response to detecting the altered need.

2. The apparatus of claim 1, wherein the resource comprises the display, the altered need based on the application switching into focus.

3. The apparatus of claim 1, wherein the resource of the plurality of types of resources comprises the processor, the code that applies further applies the one or more configuration parameters to adjust a property of the processor selected from the group consisting of a processor core configuration and a processor affinity.

4. The apparatus of claim 1, wherein a configuration parameter of the one or more configuration parameters comprises a configuration parameter transmitted from a remote source.

5. The apparatus of claim 4, wherein the resource comprises a network interface, the code that adjusts further adjusts a setting for the network interface.

6. The apparatus of claim 1, wherein the code identifies the one or more configuration parameters based on a profile of configuration parameters associated with the application.

7. The apparatus of claim 1, wherein the resource comprises memory, the code that applies further applies the one or more configuration parameters to adjust a page file for the apparatus.

8. A method comprising:
   detecting, by use of a processor, a use of a plurality of types of resources associated with an executing application;
   detecting an altered need for a resource of the plurality of types of resources in the executing application;
   identifying one or more configuration parameters for configuring an operating environment for the application, wherein at least one configuration parameter comprises a configuration parameter combined from a plurality of sources; and
   applying the one or more configuration parameters in response to detecting the altered need.

9. The method of claim 8, wherein the resource comprises a display, the altered need based on the application switching into focus.

10. The method of claim 8, wherein the resource of the plurality of types of resources comprises the processor, the applying comprises adjusting a property of the processor selected from the group consisting of a processor core configuration and a processor affinity.

11. The method of claim 8, wherein identifying one or more configuration parameters comprises identifying a configuration parameter transmitted from a remote source.

12. The method of claim 11, wherein the resource comprises a network interface, the adjusting the driver comprises adjusting a setting for the driver.

13. The method of claim 8, wherein the identifying comprises loading the one or more configuration parameters from a profile of configuration parameters associated with the application.

14. The method of claim 8, wherein the resource comprises memory, the adjusting comprises adjusting a page file.

15. A program product comprising a computer readable storage medium that stores code executable by a processor to perform:
   detecting a use of a plurality of types of resources associated with an executing application;

detecting an altered need for a resource of the plurality of types of resources in an executing application;

identifying one or more configuration parameters for configuring an operating environment for the application, wherein at least one configuration parameter comprises a configuration parameter combined from a plurality of sources; and applying the one or more configuration parameters in response to detecting the altered need.

16. The program product of claim 15, wherein the resource comprises a display, the altered need based on the application switching into a foreground.

17. The program product of claim 15, wherein the resource of the plurality of types of resources comprises the processor, the code applies the one or more configuration parameters to adjust a property of the processor selected from the group consisting of a processor core configuration and a processor affinity.

18. The program product of claim 15, wherein a configuration parameter of the one or more configuration parameters comprises a configuration parameter transmitted from a remote source.

19. The program product of claim 15, wherein the code further loads the one or more configuration parameters from a profile of configuration parameters associated with the application.

20. The program product of claim 15, wherein the resource comprises memory, the code adjusts a page file.

\* \* \* \* \*